A. C. POWELL.
FISH BASKET.
APPLICATION FILED JULY 22, 1918.
1,302,429.
Patented Apr. 29, 1919.
2 SHEETS—SHEET 1.
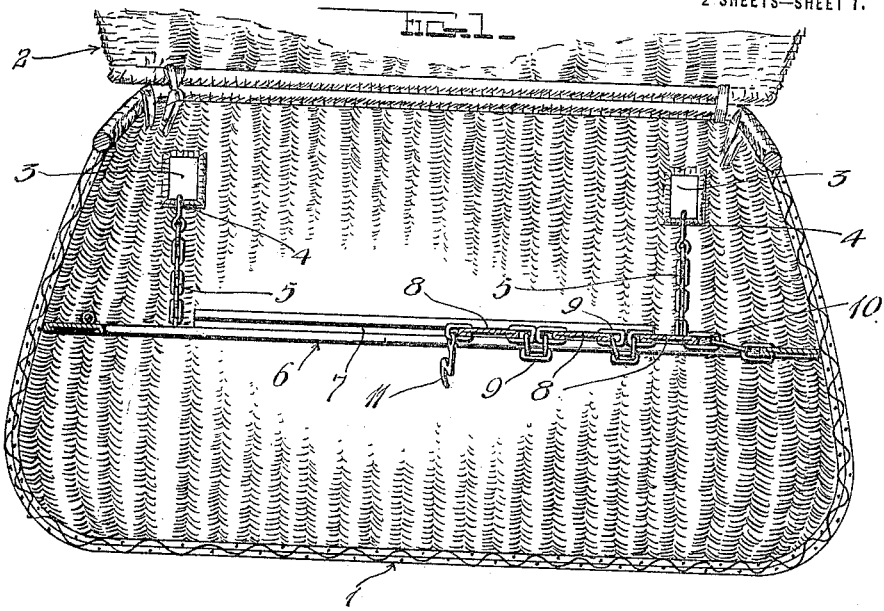
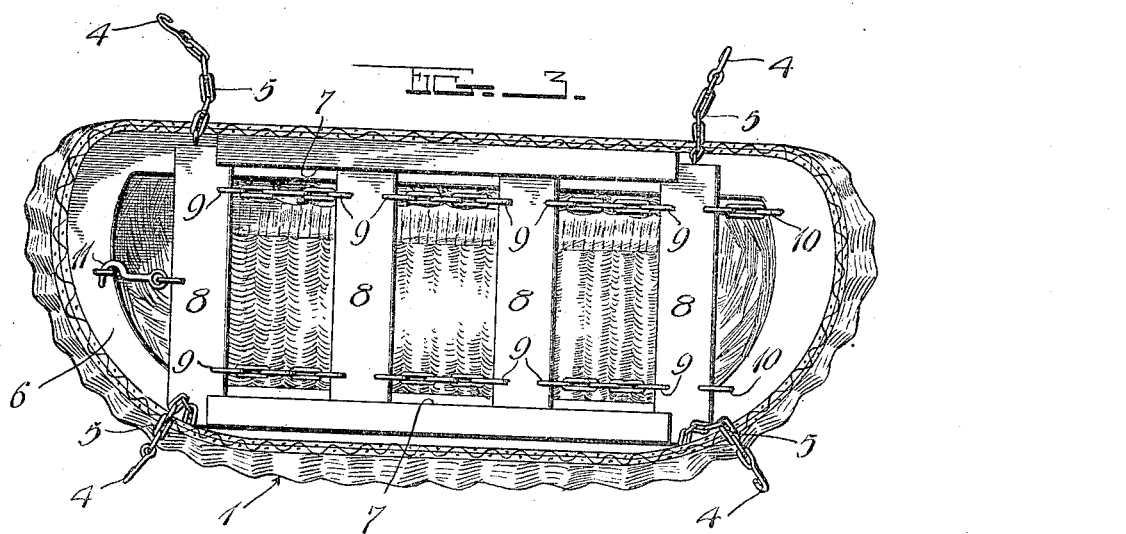
Witness
Inventor
Arthur C. Powell
By
Attorneys

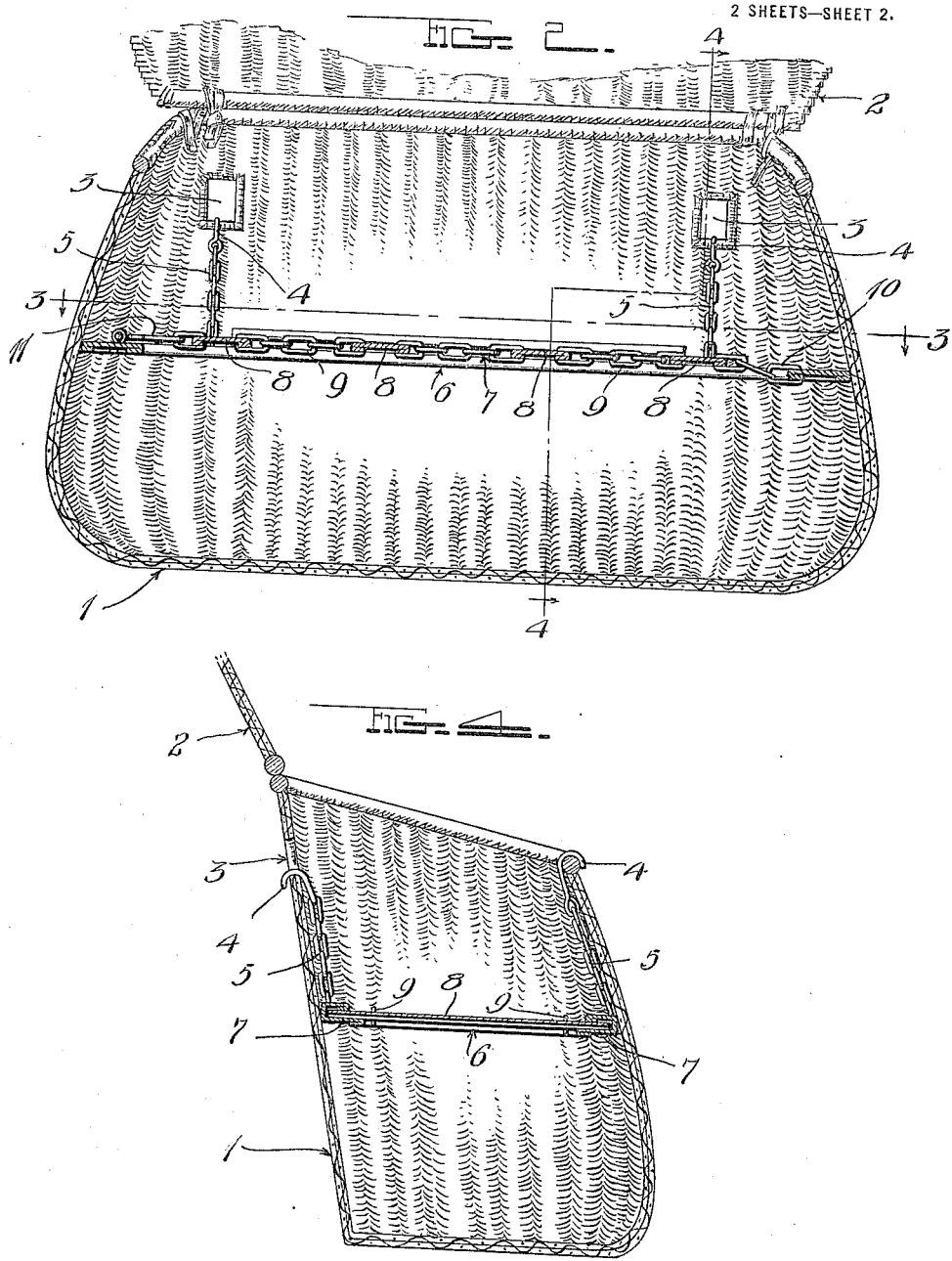

UNITED STATES PATENT OFFICE.

ARTHUR C. POWELL, OF MARYSVILLE, CALIFORNIA.

FISH-BASKET.

1,302,429.　　　　Specification of Letters Patent.　　Patented Apr. 29, 1919.

Application filed July 22, 1918. Serial No. 246,101.

*To all whom it may concern:*

Be it known that I, ARTHUR C. POWELL, a citizen of the United States, residing at Marysville, in the county of Yuba and State of California, have invented certain new and useful Improvements in Fish-Baskets; and I do declare the following to be a full, clear, and exact description of the invention, such as will enable others skilled in the art to which it appertains to make and use the same.

My invention has for its object to provide a fish basket or like receptacle in which bruising of the fish is prevented by separating those in the lower portion of the basket or the like from those in the upper portion, by a partition.

A further object is to provide the partition with means projectable from one end thereof toward the other to form the complete partition, and retractable toward said one end to permit the lower portion of the basket or other container to be filled.

An additional object is to provide a device which may be inexpensively manufactured and marketed, yet one which will be efficient and in every way desirable.

With the foregoing objects in view, the invention resides in the novel features of construction and unique combinations of parts to be hereinafter fully described and claimed, the descriptive matter being supplemented by the accompanying drawings which form a part of this application and in which:

Figure 1 is a vertical longitudinal section showing the partition arranged for filling the lower portion of the basket;

Fig. 2 is a view similar to Fig. 1 illustrating the arrangement of the partition when filling the upper portion of the basket;

Fig 3 is a horizontal section on the plane of the line 3—3 of Fig. 2; and

Fig. 4 is a vertical transverse section on the plane of the line 4—4 of Fig. 2.

In the drawings above briefly described, the numeral 1 designates a suitably constructed basket having a hinged top 2 and preferably provided in its rear side with openings 3. Hooks 4 on the upper ends of chains or other hangers 5, engage the lower ends of the openings 3 and the upper edge of the basket 1, said hangers rising from a horizontally disposed open frame 6.

The frame 6, in the present form of the invention, is formed of sheet metal, and the outer edges of the parallel side bars of said frame, are bent inwardly to provide a pair of channel shaped longitudinal tracks 7. A plurality of transverse sheet metal slats 8 have their ends received slidably in the tracks 7 and are connected to each other in spaced relation, by chains or other flexible means 9. Other chains or the like 10 are provided to retain one of the endmost slats 8 in correctly spaced relation with one end of the frame 6, while a hook or other preferred fastener 11 connects the other endmost slat with the adjacent end of the frame. By releasing the hook 11 the several slats 8 may slide from one end of frame 6 to the other end thereof as depicted in Fig. 1, whereby to give access to the lower portion of the basket for filling the same. When the desired number of fish have been placed in the basket, the slats are drawn along the frame and hook 11 used to secure them. These slats are then covered with leaves, moss or the like, and the other fish caught are deposited thereon. By thus dividing the mass of fish by the partition, bruising thereof is prevented and consequently loss from decay is prevented.

I prefer to employ the several details shown and described, but I wish it understood that within the scope of the invention as claimed, considerable latitude is allowed for making such changes as occasion may dictate.

I claim:

1. A fish basket partition comprising a horizontal, sheet metal frame whose side bars and ends are shaped to fit the basket, hangers connected to said frame for suspending it in the basket, longitudinal flanges integral with the outer edges of the aforementioned side bars, said flanges being bent upwardly and inwardly and disposed over said side bars, slats whose ends rest slidably on said side bars and are confined under said flanges, and flexible connectors tying said slats together.

2. A fish basket having a hinged top, the rear side of said basket being of greater height than the front side thereof and carrying said top, said rear side having near its ends a pair of openings spaced downwardly from its upper end, a horizontal, sheet metal frame within said basket with its sides and ends shaped to fit the same, hangers connected to said frame for suspending it in the basket, said hangers having hooks at their upper ends, certain of which are hooked into the aforesaid openings while the others engage the upper edge of the basket front, the side bars of said frame being parallel and having flanges on their outer edges bent upwardly and inwardly over said bars, a plurality of transverse slats resting on said side bars under said flanges, and flexible connectors tying said slats together.

In testimony whereof I have hereunto set my hand.

ARTHUR C. POWELL.

Copies of this patent may be obtained for five cents each, by addressing the "Commissioner of Patents, Washington, D. C."